United States Patent [19]

Igarashi

[11] Patent Number: 4,786,920

[45] Date of Patent: Nov. 22, 1988

[54] RECORDING APPARATUS

[75] Inventor: Masaru Igarashi, Yokohama, Japan

[73] Assignee: Canon Kabushiki Kaisha, Tokyo, Japan

[21] Appl. No.: 73,307

[22] Filed: Jul. 13, 1987

Related U.S. Application Data

[63] Continuation of Ser. No. 677,515, Dec. 3, 1984, abandoned.

[30] Foreign Application Priority Data

Dec. 6, 1983 [JP] Japan ................................ 58-229147
Dec. 6, 1983 [JP] Japan ................................ 58-229148

[51] Int. Cl.[4] ........................ G01D 15/24; B65H 3/44; G03G 15/00; B41J 3/42

[52] U.S. Cl. ........................................ 346/134; 271/9; 355/3 SH; 355/14 SH; 355/24; 364/900; 400/70

[58] Field of Search ........ 346/134; 355/3 SH, 14 SH, 355/24; 400/70; 364/900; 271/9

[56] References Cited

U.S. PATENT DOCUMENTS

| | | | |
|---|---|---|---|
| 4,090,787 | 5/1978 | Hubbard et al. | 355/14 |
| 4,436,406 | 3/1984 | Murasani et al. | 355/3 SH |
| 4,474,454 | 10/1984 | Sugiura | 355/14 R |
| 4,556,959 | 12/1985 | Allen et al. | 364/900 |
| 4,638,368 | 1/1987 | Shimizu et al. | 358/256 |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A recording apparatus such as a laser beam printer has a laser beam unit for forming an image, a cassette for automatically feeding paper sheets, a manual insertion port for allowing manual insertion of paper sheets, a switch to allow selection of the cassette sheet feed or manual insertion sheet feed at the side of the printer, a timer to count a predetermined period of time, and a CPU for switching from the manual insertion sheet feed mode to the cassette sheet feed mode when no paper sheet is manually inserted in the manual insertion sheet feed mode after the time in the timer has elapsed. Undesired accumulation of data designating printing in the cassette sheet feed mode is prevented.

11 Claims, 13 Drawing Sheets

RECORDING APPARATUS

This application is a continuation of application Ser. No. 677,515, filed Dec. 3, 1984,now abandoned.

BACKGROUND OF THE INVENTION

1. Field of the Invention

The present invention relates to a recording apparatus capable of feeding a recording medium in one of a plurality of modes.

2. Description of the Prior Art

Conventional printers are classified into line printers developed as output devices of computers, and into serial printers developed from typewriters, as original output devices. A line printer can print a large quantity of numerical data at high speed. Roll paper or cut paper sheets are supplied to a line printer in cassette form.

On the other hand, a serial printer prints only a small quantity of data at a low speed but with high quality. In a serial printer capable of cassette and manual sheet feed, manual insertion sheet feed is given priority over cassette sheet feed. For this reason, when printing is performed in the manual insertion sheet feed mode, if the manual insertion sheet feed is not completed before the transmission of printing data, the cassette sheet feed mode automatically set. In order to prevent this, the printer must be located at the side of the host computer, thus limiting the location of the printer installation. When a single printer is commonly used by a plurality of host computers, correspondence between printing data from each host computer with sheet feeding means is difficult to establish, and interrupt by manual insertion sheet feed cannot be performed.

When an image formation apparatus having both a cassette sheet feed mechanism and a manual insertion sheet feed mechanism is operated in the cassette sheet feed mode, input of printing data results in automatic printing even if an operator is not nearby to check the operating state of the apparatus. Once the manual insertion sheet feed mode is set by a manual insertion sheet feed instruction from a host computer transmitting data or by an auxiliary switch located on an apparatus housing, printing cannot be started if no printing paper sheets are fed through a manual insertion port even after data from the host computer is received. When the auxiliary switch is switched or an instruction is received from the host computer to set the manual insertion sheet feed mode, printing in the cassette sheet feed mode is stopped. When a manual insertion sheet feed mechanism is incorporated, the number of types of printing sheets which can be used for printing is increased as compared to the case wherein only the cassette sheet feed mechanism is incorporated. However, when the manual insertion sheet feed mode is set, printing of the printing data by cassette sheet feed is stopped unless the operator is nearby correct this state.

Various image formation apparatuses are known including one which is connected to a plurality of host computers and sequentially prints data received from the host computers, and one which allows a host computer (spooler) to store printing data and sequentially receives the printing data and prints the received data. In either type of image formation apparatus, when the manual insertion sheet feed mode is set, printing data to be printed by cassette sheet feed is left unprinted and accumulated in large volume.

SUMMARY OF THE INVENTION

The present invention was made in consideration of the above-mentioned drawbacks and one of its object is to provide an improved recording apparatus.

It is another object of the present invention to provide a recording apparatus which can effectively switch among a plurality of recording medium feed modes in order to improve recording efficiency.

It is still another object of the present invention to provide a recording apparatus which can reduce recording stop time.

It is still another object of the present invention to provide a recording apparatus which allows designation of a manual insertion sheet feed mode and a cassette sheet feed mode from either of the data transmission side and the printer side so as to allow continuous cassette sheet feed and manual insertion sheet feed, as needed.

It is still another object of the present invention to provide a recording apparatus which releases within a predetermined period of time interruption of the cassette sheet feed mode when the manual insertion sheet feed mode is designated.

It is still another object of the present invention to provide a recording apparatus which can record at a proper timing.

The above and other objects, features and advantages of the present invention will become apparent from the following description taken in conjunction with the accompanying drawings.

DETAILED DESCRIPTION OF THE PREFERRED EMBODIMENTS

Figure 1:
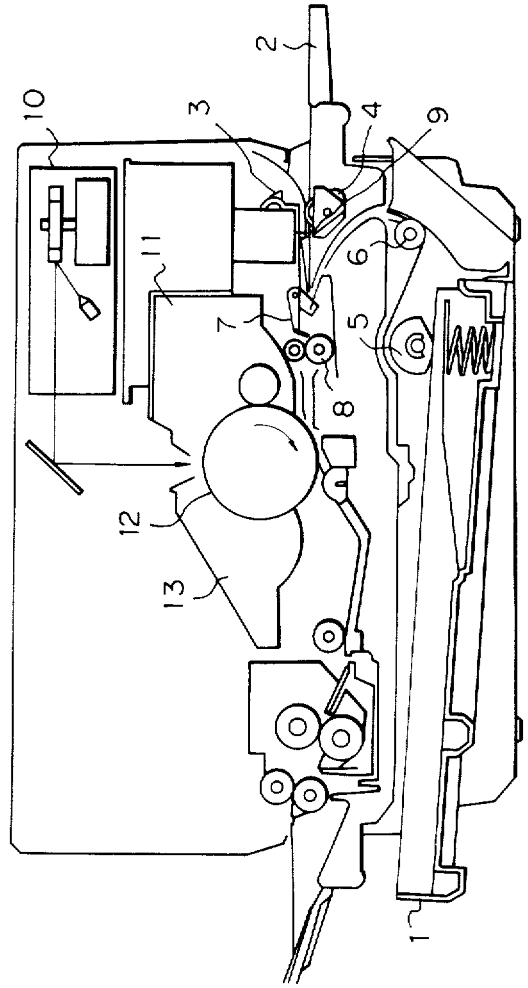
FIG. 1 is a sectional view of a laser beam printer of electrophotographic type according to an embodiment of the present invention.

FIG. 1 is a sectional view of a laser beam printer of the electrophotographic type according to an embodiment of the present invention.

A sheet feed cassette 1 of a cassette sheet feed system and a manual insertion sheet feed tray 2 of a manual insertion sheet feed system are arranged at opposing sides of the printer. Upper and lower rollers 3 and 4 feed a sheet manually inserted through the manual insertion sheet feed tray 2. A pick-up roller 5 picks up an uppermost sheet in the cassette 1. A convey roller 6 conveys the picked up sheet. A register shutter 7 temporarily stops a sheet fed by cassette sheet feed or manual insertion sheet feed. A convey roller 8 conveys the sheet released from the shutter 7. A sheet feed sensor 9 detects that a printing paper sheet is set by manual insertion. The printer further has a scanning laser unit 10, an electrophotographic developing unit 11, a photosensitive drum 12, and a cleaning unit 13 for cleaning a surface of the drum 12. The convey operation of the sheet will be described with reference to FIG. 1.

Printing paper sheets are sequentially conveyed from the cassette 1 through the pick-up roller 5 and the convey roller 6 and are temporarily stopped by the register shutter 7 so as to achieve synchronization with the scanning laser unit 10 and the photosensitive drum 12. After synchronization is achieved, the printing paper sheets are conveyed to the photosensitive drum 12 through the convey roller 8.

Printing paper sheets supplied by manual insertion sheet feed are conveyed in the following manner. The sheets are sequentially conveyed from the tray 2 through the gap between the upper and lower rollers 3 and 4. Thereafter, the sheets are conveyed in the same manner as in the case of paper sheet feed from the sheet feed cassette 1.

The upper and lower rollers 3 and 4 are normally separated from each other. When a printing paper sheet is set on the tray 2 and is detected by the sheet feed sensor 9, a plunger (not shown) is turned on to move the upper roller 3 downward. Then, the printing paper sheet is urged between the upper and lower rollers 3 and 4 and conveyed thereby.

The configuration of a control section of the embodiment described above will be described with reference to FIGS. 2 and 3.

Figure 2:
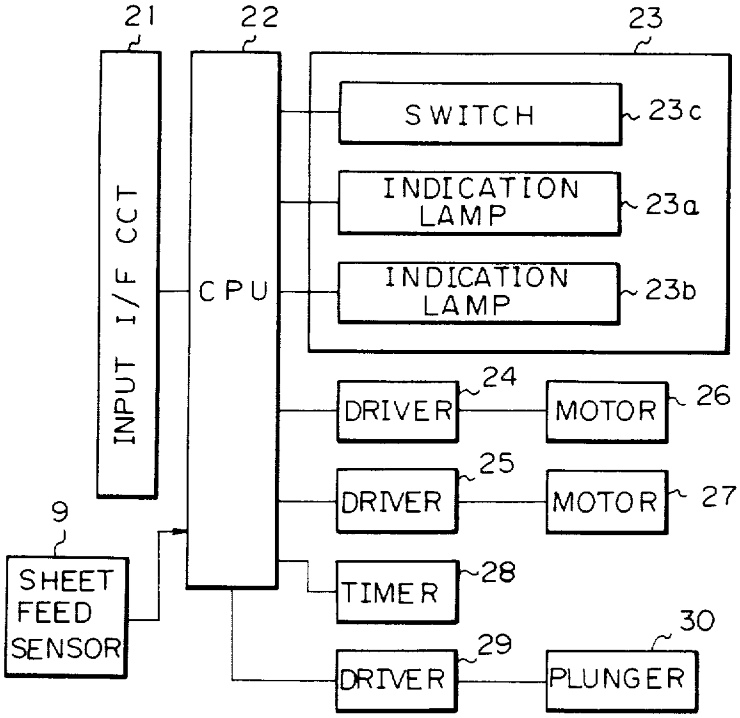
FIG. 2 is a block diagram showing the configuration of the embodiment shown in FIG. 1.

FIG. 2 is a block diagram showing the configuration of the control section of the embodiment of the present invention. Referring to FIG. 2, an input I/F circuit 21 and the sheet feed sensor 9 are connected to input ports of a CPU 22. An indication section 23 consists of a switch **23*c* and indication lamps 23*a* and 23*b* which are connected to corresponding output ports of the CPU 22. Drivers 24 and 25 drive motors 26 and 27, respectively, in the cassette sheet feed mode and the manual insertion sheet feed mode. A timer 28 is connected to an output port of the CPU 22. A driver 29 for driving a plunger 30 is connected to an output port of the CPU 22. When the indication lamp 23*a* is ON, it indicates that the manual insertion sheet feed mode is selected. When the indication lamp 23*b* is ON, it indicates that the cassette sheet feed mode is selected. The switch 23*c* is a manual/cassette changeover switch which is used to select the manual insertion sheet feed mode or the cassette sheet feed mode. The input I/F circuit 21** receives printing data.

Figure 3:
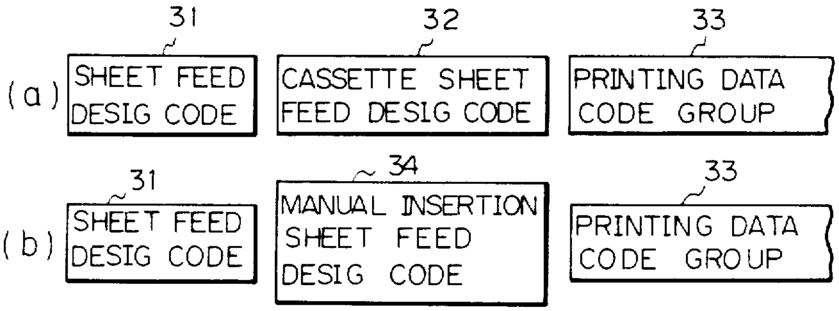
FIG. 3 shows a data format of printing data according to the present invention.

FIG. 3 shows a format of printing data. As seen from FIG. 3, each printing data consists of a sheet feed designation code 31, a cassette sheet feed designation code 32 or a manual insertion sheet feed designation code 34, and a printing data code group 33. The sheet feed designation code 31 is a special control code for discriminating between printing data and control data and is a code designating sheet feed.

The operation of each part will be described with reference to the printing control flow charts shown in FIGS. 4 and 5.

A system corresponding to the selected mode between the manual insertion sheet feed mode and the cassette sheet feed mode is selected to drive a corresponding motor between the motors 26 and 27. This can be achieved by designation from a host computer 100 for transmitting printing data or by the manual/cassette changeover switch **23*c* at the printer side. Designation of the sheet feed mode from the side of the host computer 100 will be described with reference to FIG. 4. In FIG. 4**, numbers in parentheses are steps.

When the CPU 22 receives through the input I/F circuit 21 the printing data code group 33 accompanied by the cassette sheet feed designation code 32 or the manual insertion sheet feed designation code 34, the CPU 22 checks if the received data is printing data in step (42). If YES in step (42), printing data processing is performed. If NO in step (42), it is checked in step (43) if the data is the sheet feed designation code 31. If NO in step (43), it is checked if the data is another code. When YES in step (43), it is then checked in step (44) if the next code is the cassette sheet feed designation code 32 or the manual insertion sheet feed designation code 34. If it is determined that the code is the cassette sheet feed designation code 32, the indication lamp **23*b* of the indication section 23 is turned off in step (51), the indication lamp 23*a* is turned on in step (52), and the presence/absence of a printing paper sheet is checked in step (53). When there is no printing paper sheet, "no sheet" is displayed in step (54) until the replenishment of sheets takes place. When it is determined in step (53) that printing paper sheets are present, it is checked in step (55) if the apparatus is printing. If YES in the step (55), the control sequence holds until printing ends in step (56). If NO in step (55), the CPU 22 supplies a drive signal to the motor 26 for driving the pick-up roller 5 and the convey roller 6 in step (57). When the pick-up roller 5 and the convey roller 6 start rotating, a printing paper sheet is conveyed. In order to synchronize the sheet with the photosensitive drum 12 and the scan laser unit 10, the printing paper sheet is temporarily stopped by the register shutter 7**. After synchronization, exposure is started.

On the other hand, if it is determined in step (44) that the code next to the sheet feed designation code 31 is the manual insertion sheet feed code 34, the indication lamp **23*b* of the indication section 2 is turned off in step (45) and the indication lamp 23*a* is turned on in step (46). It is then checked in step (47) if the printer is printing. If YES in step (47), the control sequence holds until printing ends in step (48). If NO in step (47), the CPU 22 supplies a drive signal to the motor 27 for driving the upper and lower rollers 3 and 4 in step (49). When it is detected in step (50) that the printing paper sheet is set by the paper sheet sensor 9 after the generation of the drive signal, the CPU 22 turns on the plunger 30 through the driver 29 so as to move the upper roller 3 downward and to convey the manually inserted printing paper sheet. In order to achieve synchronization with the photosensitive drum 12 and the scan laser unit 10, the sheet is temporarily stopped by the register shutter 7. After synchronization is achieved, exposure is started. In this manner, whether the sheet feed mode designated by the host computer side is the cassette sheet feed mode or the manual insertion sheet feed mode can be indicated to the operator by means of the ON/OFF state of the indication lamps 3*a* and 23*b***.

A case of designating the sheet feed mode by the manual/cassette changeover switch **23*c* at the printer side will be described with reference to the printing control flow chart shown in FIG. 5**. Again the numbers in parentheses refer to steps.

Selection of a sheet feed mode by means of the manual/cassette changeover switch **23*c* at the printer side must be performed, when the sheet feed designation code 31 and the cassette sheet feed designation code 32 or the manual insertion sheet feed designation code 34 is accidentally omitted or cannot be inserted during creation of printing data at the host computer 100**.

Figure 5:
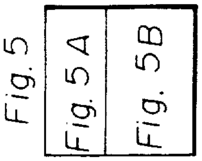
Figure 5A:
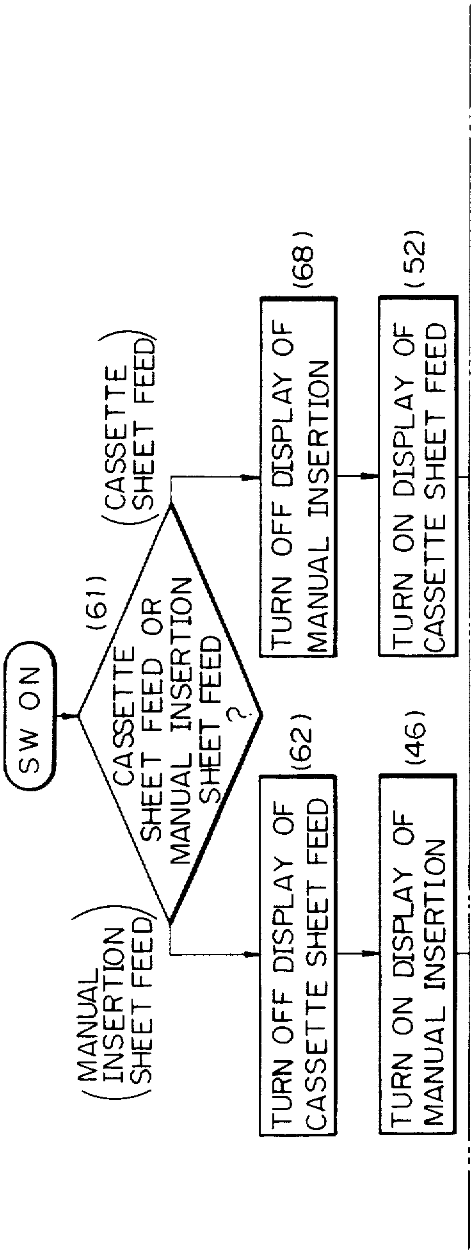
Figure 5B:
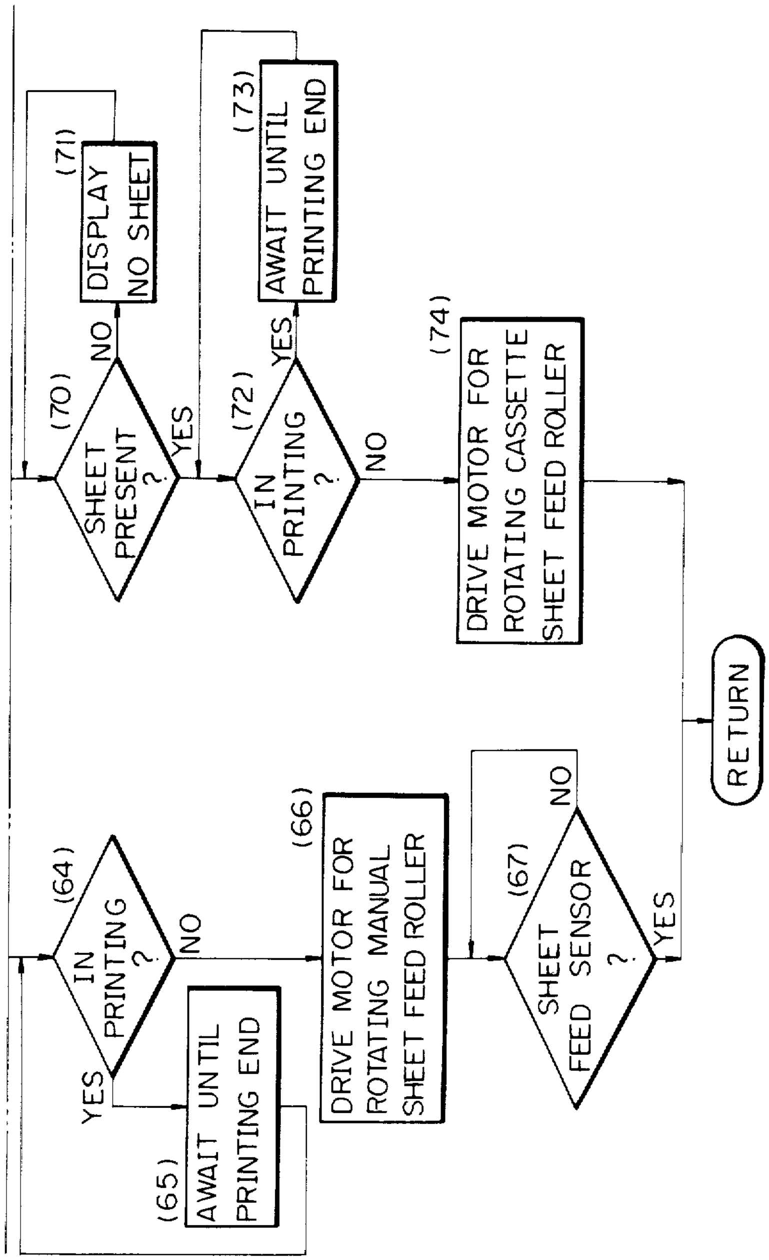

The manual/cassette changeover switch 23c is turned on to interrupt the CPU 22 (FIG. 5). It is first checked in step (61) if the selected mode is the manual insertion sheet feed code or the cassette sheet feed mode. If the mode is the manual insertion sheet feed mode, the CPU 22 generates a cassette sheet feed OFF signal so as to turn off the indication lamp 23b in step (62) and also generates a manual insertion sheet feed ON signal to turn on the indication lamp 23a in step (63). After the manual insertion sheet feed ON signal is produced, it is checked if the printer is printing in step (64). If YES in step (64), the control sequence holds until the printing ends in step (65). If NO in step (64) and printing can be started, the CPU 22 supplies a drive signal to the motor 27 for driving the upper and lower rollers 3 and 4 in step (66) and awaits for the paper sheet to be fed. When the manual insertion of a paper sheet is performed after the generation of the drive signal, it is checked in step (67) if the printing paper sheet is set by the sheet feed sensor 9. When YES in step (67), the CPU 22 turns on the plunger 30 through the driver 29 so as to move the upper roller 3 downward and to convey the supplied printing paper sheet. In order to achieve synchronization with the photosensitive drum 12 and the scan laser unit 10, the printing paper sheet is temporarily stopped by the register shutter 7. After synchronization, exposure is started. If NO in step (67), exposure is delayed until a printing paper sheet is fed.

When it is determined in step (61) that the cassette sheet feed mode is set by turning on the manual/cassette changeover switch 23c, the indication lamp 23b is turned off in step (68) and the indication lamp 23a is turned on in step (69). When it is determined in step (70) that no printing paper sheet is present, "no sheet" is displayed in step (71) and supply of a printing paper sheet from the sheet feed cassette 1 is awaited. If YES in step (70), it is checked if the printing is printing in step (72). If YES in step (72), the control sequence holds until printing ends. If NO in step (72) and printing can be started, the CPU 22 supplies a drive signal to the motor 26 for driving the convey roller 6 and the pick-up roller 5 in step (74). After producing a drive signal, the printing paper sheet is temporarily stopped by the register shutter 7 so as to allow synchronization with the photosensitive drum 12 and the scan laser unit 10. After the synchronization is achieved, exposure is started.

An application of the present invention will now be described with reference to the accompanying drawings.

When no operator is at the side of the printer when manual insertion sheet feed is instructed at the host computer side or when the operator forgets to insert a sheet, subsequent printing data designating printing in the cassette sheet feed mode must be printed. In order to restore the cassette sheet feed mode in such a case despite the manual insertion sheet feed ON signal from the host computer, the control sequence shown in FIG. 6 is added at step (49) or thereafter in the printing control flow chart shown in FIG. 4 described with reference to the above embodiment.

Figure 4A:
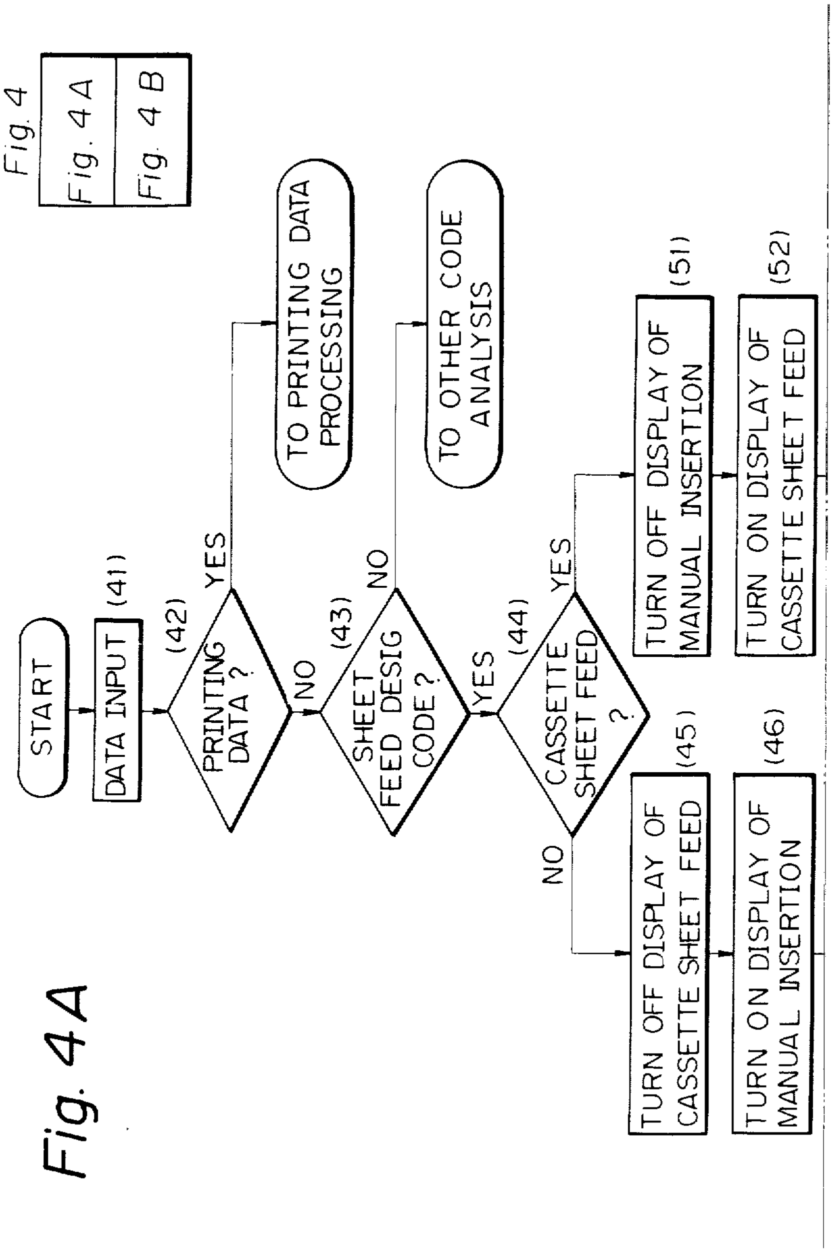
FIG. 4 composed of FIGS. 4A and 4B to FIG. 6 composed of FIGS. 6A, 6B and 6C are flow charts showing the printing data control sequence according to the present invention.
Figure 4B:
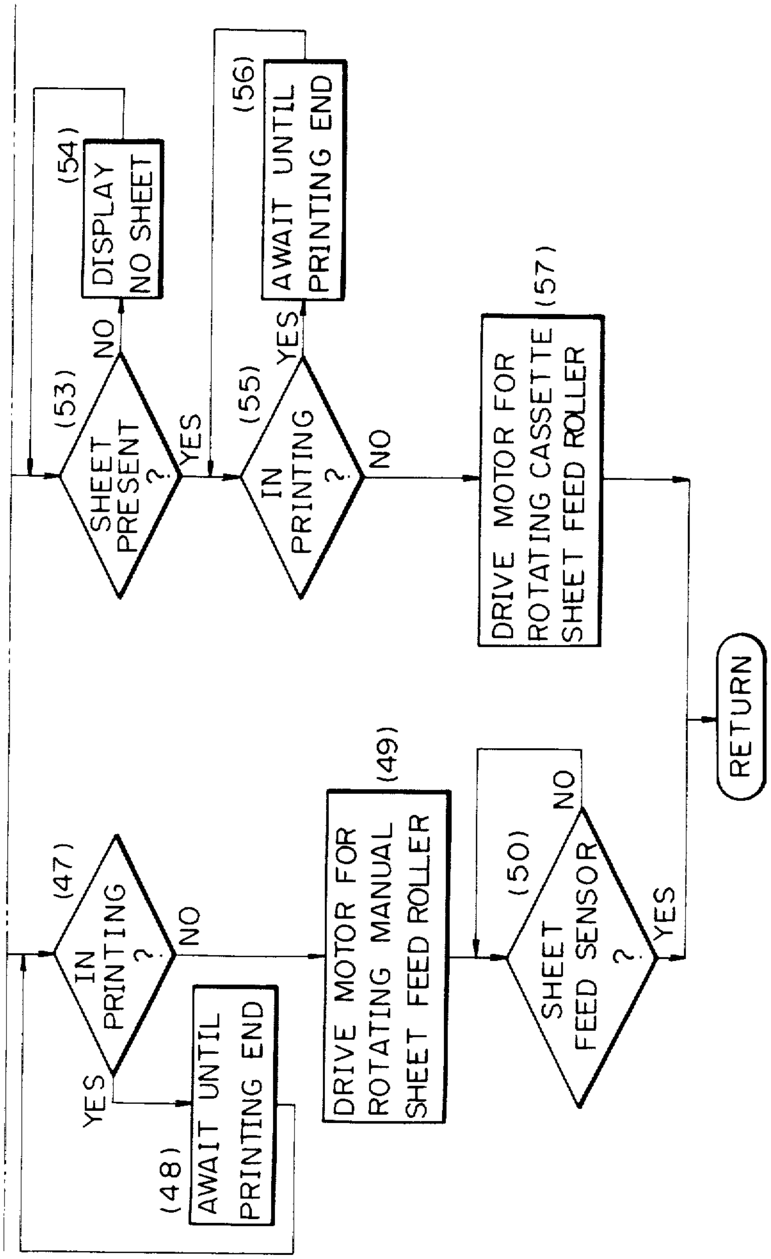
Figure 6A:
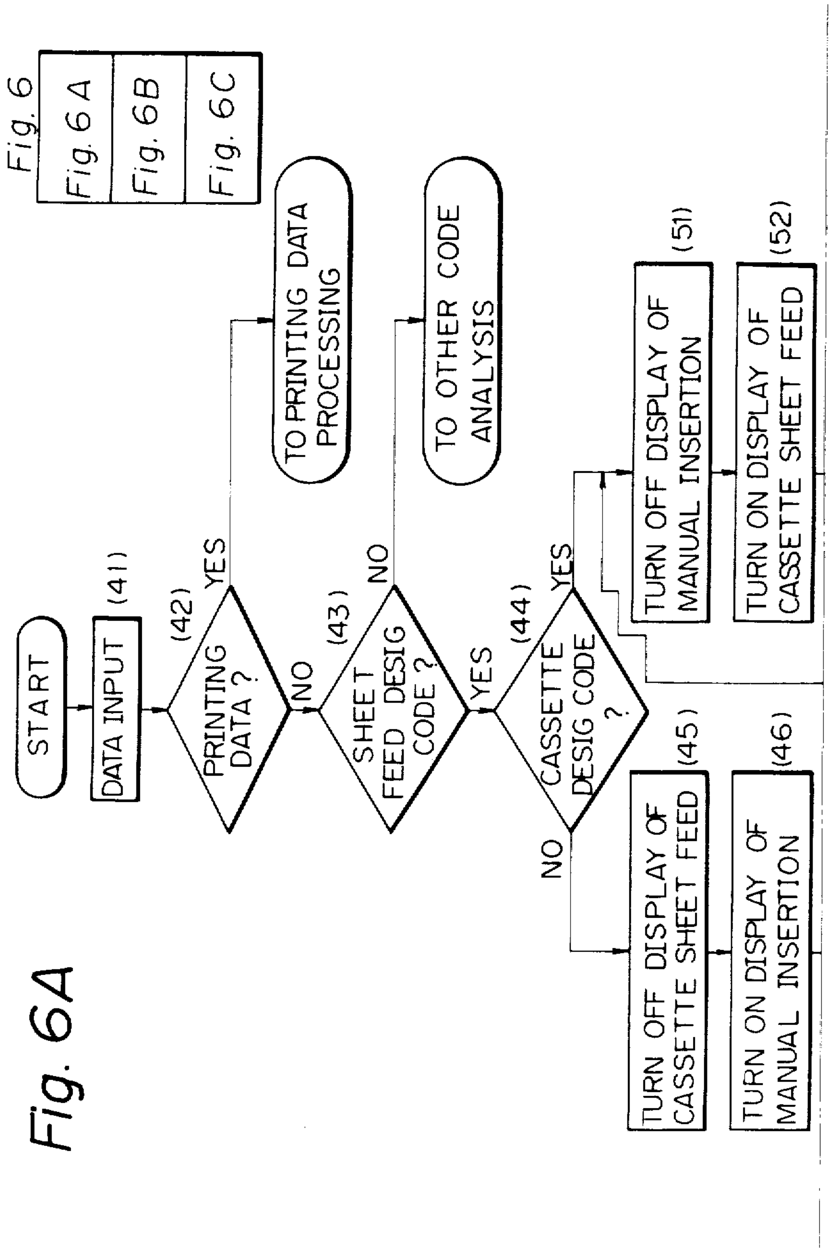
Figure 6B:
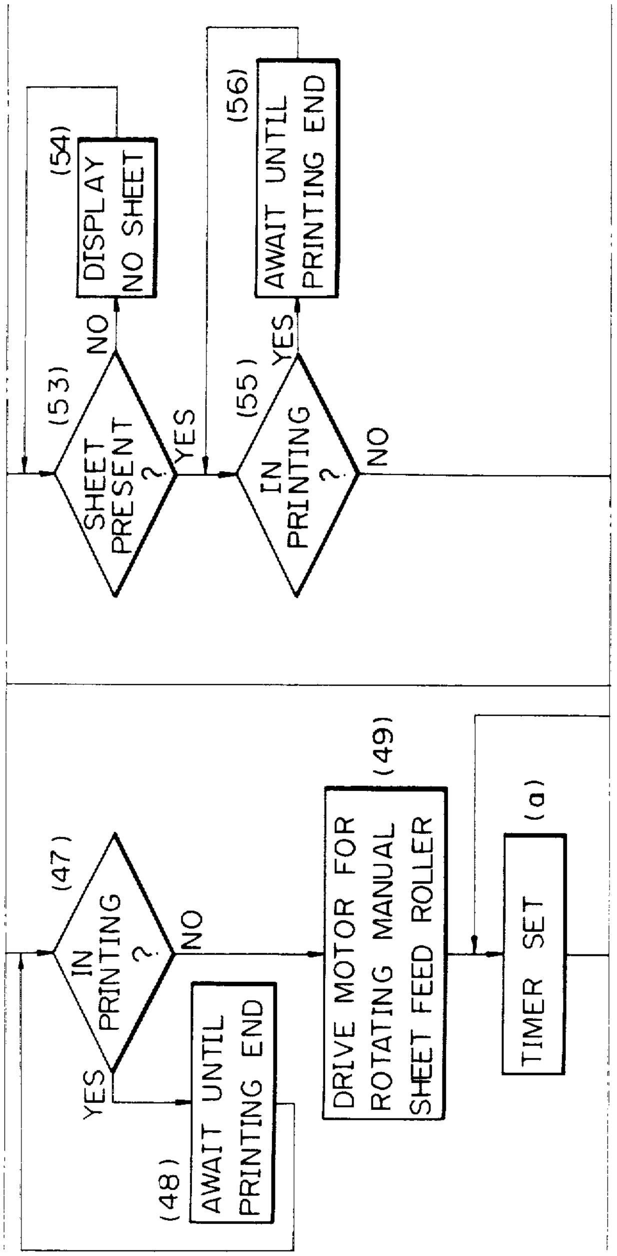
Figure 6C:
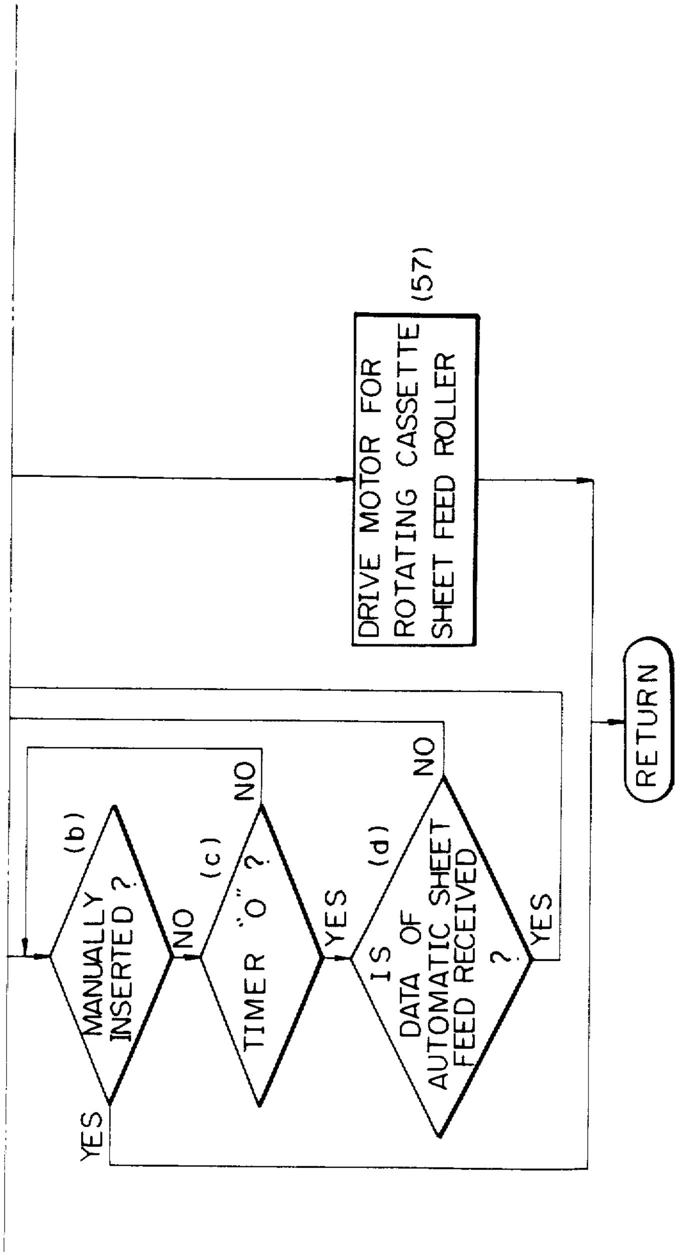

In FIG. 6, letters in parentheses denote substeps, and the steps associated with numbers in parentheses are the same as that in FIG. 4.

After a drive signal is generated in step (49), a predetermined period of time is set in a timer 28 (10 minutes in this embodiment) in substep (a). After the timer 28 is started, it is discriminated in substep (b) if a printing paper sheet is set by means of the sheet feed sensor 9. When YES in substep (b), the plunger 30 is turned on to start conveying the printing paper sheet and to start printing. However, if NO in substep (b), it is discriminated in substep (c) if the time in the timer 28 is up. If NO in substep (c), paper sheet feed is awaited until the time in the timer 28 is up. When the time is up (for example after 10 minutes) in this embodiment, reception of the printing data designating printing in the cassette sheet feed is discriminated in substep (d). If YES in substep (d), the flow jumps to step (51). If NO in substep (d), the flow returns to substep (a) to start counting the preset time with the timer 28. In this manner, when the supplying of printing paper sheets by manual insertion is not detected within a predetermined period of time, the manual sheet feed mode is switched to the cassette sheet feed mode so as to allow printing data designating printing in the cassette sheet feed mode.

The printer is a page printer and can store printing data of several pages in an internal buffer. Therefore, in the above application, substep (d) is performed; if printing data designating printing in the cassette sheet feed mode is stored in the internal buffer, it is printed.

When the flow jumps from substep (d) to step (51), printing data designating printing by manual insertion sheet feed is deleted from the internal buffer, and subsequent printing data designating printing in the cassette sheet feed mode is printed. However, the printing data designating printing by manual insertion sheet feed need not be deleted from the internal buffer. In this case, when a manually inserted sheet is detected by the sheet feed sensor 9, printing data designating printing in the manual sheet feed mode can be printed. However, until the sheet feed sensor 9 detects a manually inserted sheet, printing data designating printing in the cassette sheet feed mode is printed.

Figure 7A:
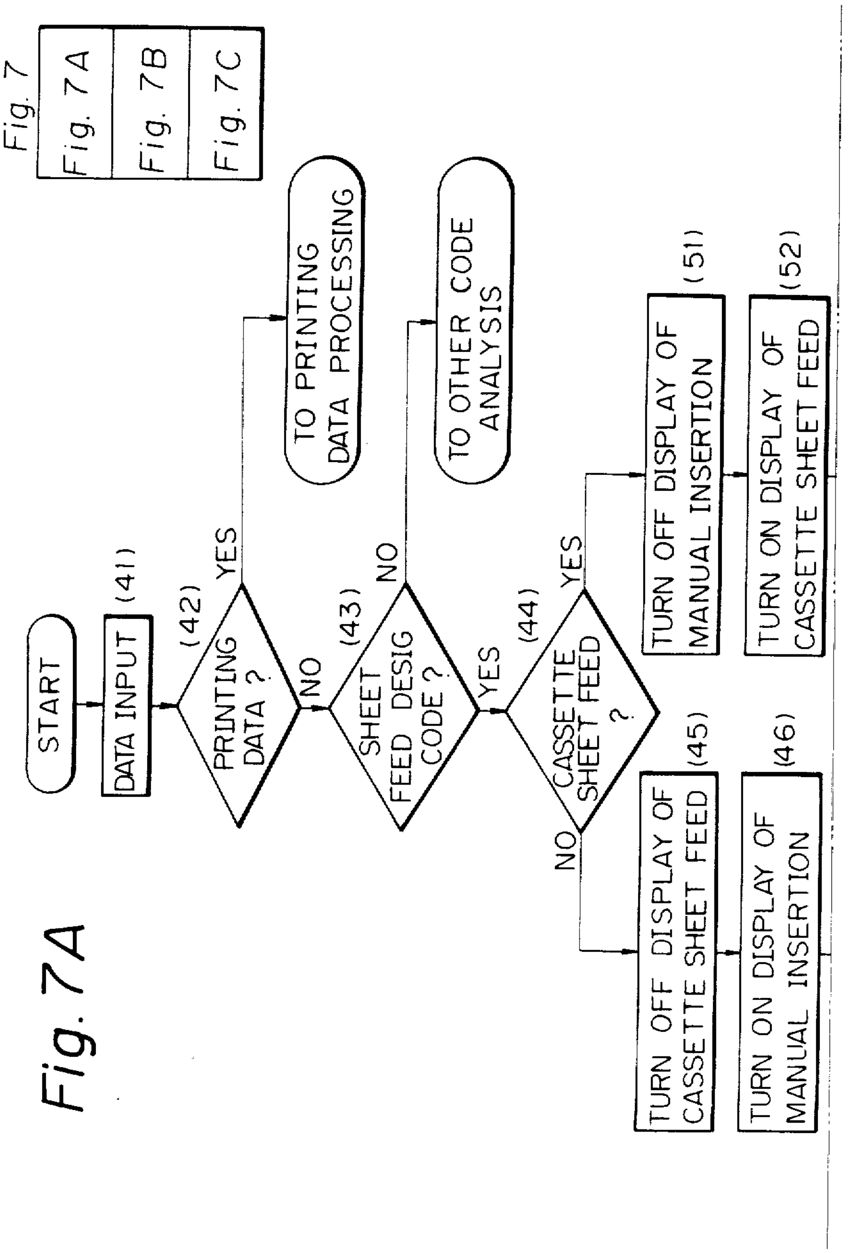
FIG. 7 composed of FIGS. 7A, 7B and 7C is a flow chart of a printing data control sequence according to another embodiment of the present invention.
Figure 7B:
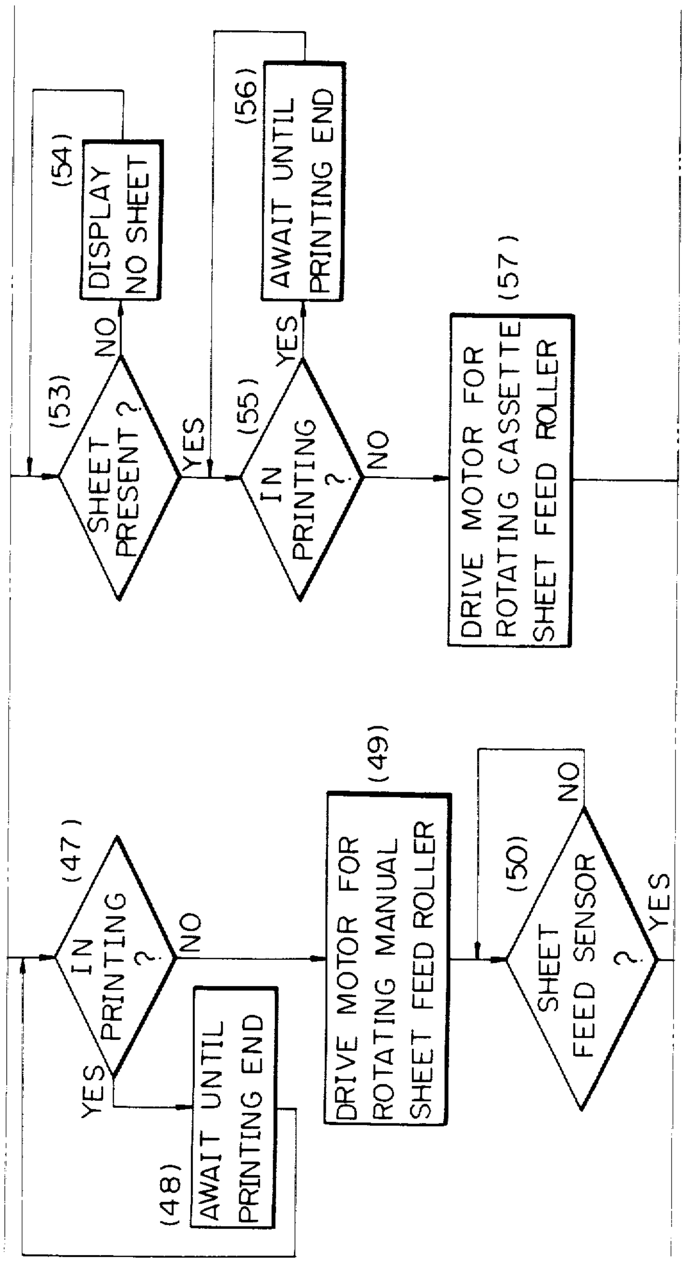
Figure 7C:
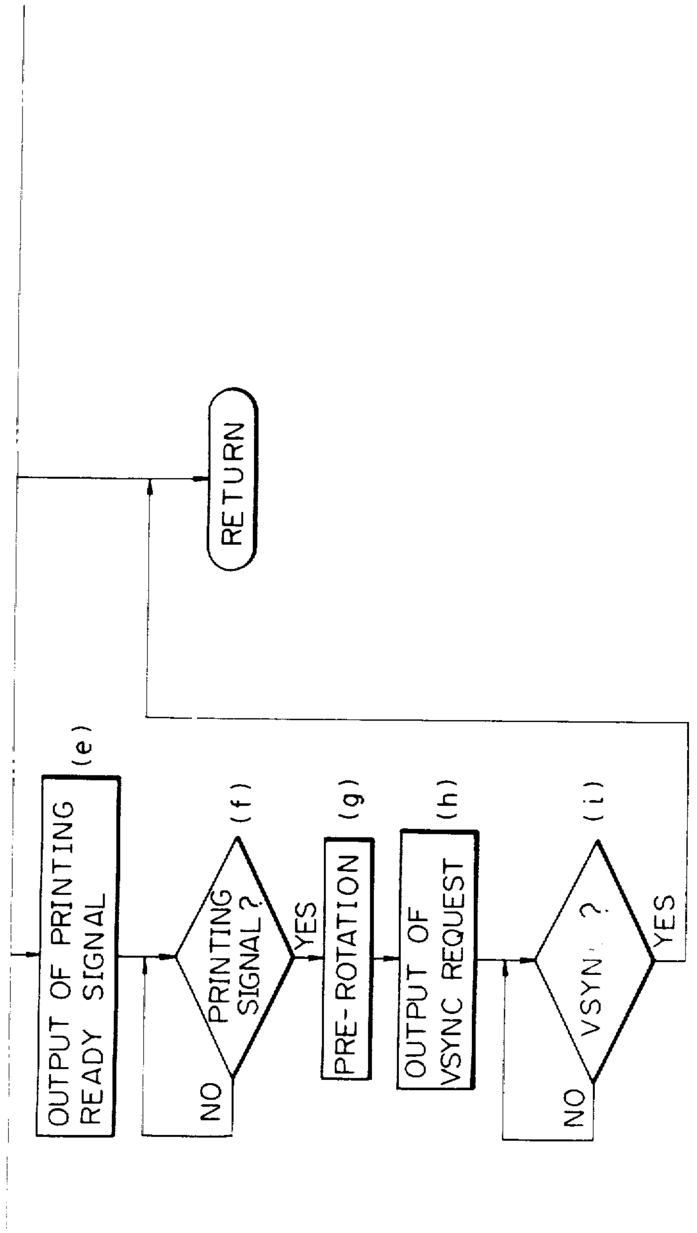
Figure 8:
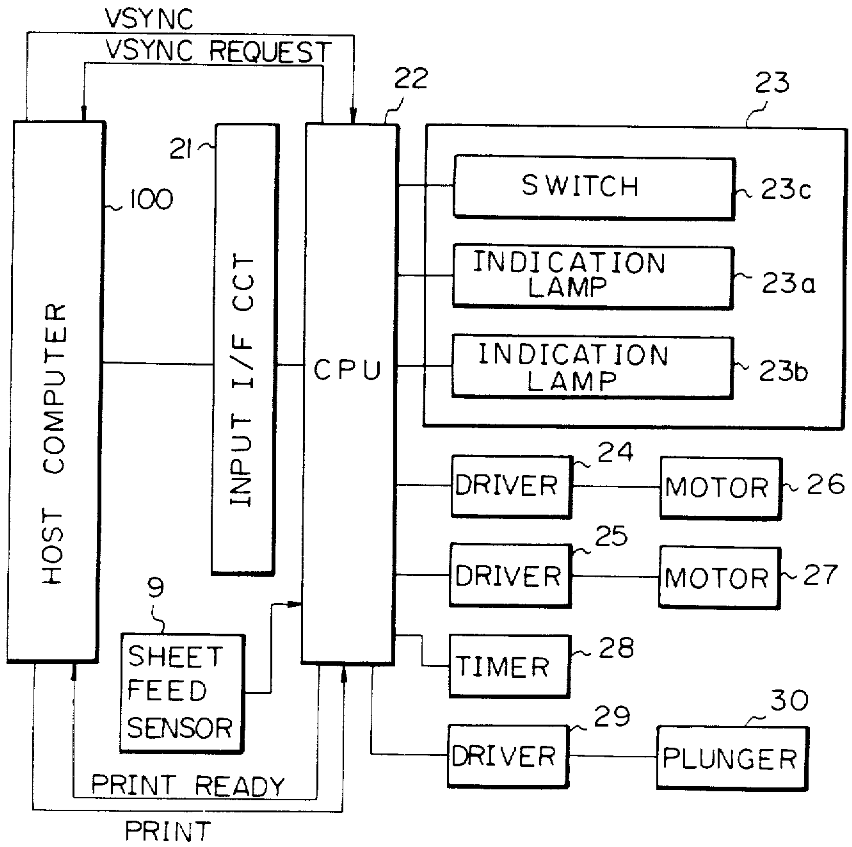
FIG. 8 is a block diagram of a control section for performing the control sequence shown in FIG. 7.

Control will be described with reference to a case wherein the printer does not have an internal buffer, with reference to FIG. 7. FIG. 7 is a flow chart of a control sequence when a sheet feed mode is designated from the side of the host computer. FIG. 8 is a block diagram of a control section for executing the control sequence shown in FIG. 7. Referring to FIG. 7, steps (41) to (57) are the same as those in FIG. 4, and a detailed description thereof will be omitted. Furthermore, the same parts with the same reference numerals as in FIG. 2 are of the same configuration.

When the sheet feed sensor 9 detects setting of a manually inserted printing paper sheet in the manual insertion sheet feed mode, it supplies a print ready signal to the host computer 100 in substep (e). When a printing signal is supplied from the host computer 100 to the CPU 22 in substep (f), the predischarger lamp, the charger and the like are driven to delete any residual charge on the photosensitive drum 12 from a previous image formation and to perform pre-rotation of the photosensitive drum 12 to set a proper drum sensitivity in substep (g). A VSYNC request signal requesting sending of printing data is supplied to the host computer 100 in substep (h). When the VSYNC signal is received before reception of printing data from the host computer 100 in substep (i), the register shutter 7 is opened at a predetermined timing to convey printing paper sheets.

When a sheet feed mode is to be selected by means of the switch at the side of the printer, substeps (e) to (i) can be inserted after YES of substep (b) in FIG. 5.

With this control operation, printing can be performed at a proper timing even if the printer does not have a page memory.

In the above embodiment, the present invention is applied to a combination of electrophotography and laser systems. However, the present invention is not limited to this. For example, the present invention can be applied to an ink-jet printer, a thermal transfer printer or the like.

Information to be printed may be printing data from a computer or the like or image data or the like read by a CCD or the like.

What is claimed is:

1. A recording apparatus comprising:

a recording information generation section for providing recording information and control data;

recording means for recording on a recording medium recording information provided by said recording information generation section;

first sheet feed means for feeding the recording medium to said recording means in a first mode;

second sheet feed means for feeding the recording medium to said recording means in a second mode;

input means for producing a select signal to manually select either one of the first mode or the second mode; and control means for selecting one of said first and second modes in accordance with at least one of control data from said recording information generation section or the select signal from said input means, said control means being operable to inhibit mode switching, during a period of time when a recording operation is being carried out on the recording medium fed in said first mode or said second mode, even though an instruction of switching to another mode occurs based on at least one of the control data or the select signal.

2. An apparatus according to claim 1, wherein said first sheet feed means has storage means for storing a plurality of recording media, and the first mode is a mode for feeding the recording medium from said storage means.

3. An apparatus according to claim 1, wherein said second sheet feed means has manual insertion sheet feed means for feeding a recording medium manually inserted, and the second mode is a mode for feeding the recording medium from said manual insertion sheet feed means.

4. An apparatus according to claim 1, further comprising display means for displaying one of said sheet feed means which is selected by said control means.

5. A recording apparatus according to claim 1, wherein said control means permits mode switching by an instruction based on at least one of the control data or the select signal, after completion of the recording operation on the recording medium fed in one of the first mode or the second mode.

6. A recording apparatus comprising:

a recording information generation section for providing recording information;

recording means for recording on a recording medium recording information provided by said recording information generation section;

first sheet feed means for feeding the recording medium to said recording means in a first mode;

second sheet feed means for feeding the recording medium to said recording means in a second mode;

timer means for which initiates a timer operation in response to the selection of said second sheet feed means for counting a predetermined period of time; and control means for switching from said second sheet feed means to said first sheet feed means in response to said timer means when the recording medium is not supplied from said second sheet feed means within the predetermined period of time.

7. An apparatus according to claim 6, wherein said first sheet feed means has storage means for storing a plurality of recording media, and the first mode is a mode for feeding the recoridng medium from said storage means.

8. An apparatus according to claim 6, wherein said second sheet feed means has manual insertion sheet feed means for feeding a recording medium which is manually inserted, and the second mode is a mode for feeding the recording medium from said manual insertion sheet feed means.

9. An apparatus according to claim 6, wherein said control means selects one of said first and second sheet feed means in accordance with control data from said recording information generation section.

10. An apparatus according to claim 9, further comprising display means for displaying one of said sheet feed means selected by said control means.

11. A recording apparatus according to claim 6, wherein said control means switches from the second mode to the first mode, if the recording medium is not supplied within the predetermined period of time, and also if the recording information is received.

* * * * *

UNITED STATES PATENT AND TRADEMARK OFFICE

CERTIFICATE OF CORRECTION

PATENT NO. : 4,786,920

DATED : November 22, 1988

INVENTOR(S) : Masaru Igarashi

It is certified that error appears in the above-identified patent and that said Letters Patent is hereby corrected as shown below:

Column 1, delete lines 36 to 68, inclusive.

Signed and Sealed this

Thirteenth Day of August, 1996

Attest:

BRUCE LEHMAN

*Attesting Officer* *Commissioner of Patents and Trademarks*